United States Patent
Ganapathy et al.

(10) Patent No.: US 12,417,108 B2
(45) Date of Patent: Sep. 16, 2025

(54) SYSTEM AND METHOD FOR GENERATING A CONTEXT-BASED USER INTERFACE

(71) Applicant: Bank of America Corporation, Charlotte, NC (US)

(72) Inventors: Sudha Ganapathy, Chennai (IN); Anurajam Rajagopalan, Chennai (IN); Durga Prasad P Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 144 days.

(21) Appl. No.: 18/365,751

(22) Filed: Aug. 4, 2023

(65) Prior Publication Data

US 2025/0045073 A1  Feb. 6, 2025

(51) Int. Cl.
*G06F 9/451* (2018.01)
*G06F 11/34* (2006.01)

(52) U.S. Cl.
CPC .......... *G06F 9/451* (2018.02); *G06F 11/3438* (2013.01)

(58) Field of Classification Search
CPC ................................................ G06F 3/0482
See application file for complete search history.

(56) References Cited

U.S. PATENT DOCUMENTS

| | | |
|---|---|---|
| 8,196,104 B2 | 6/2012 | Cohr et al. |
| 8,578,278 B2 | 11/2013 | Rauh et al. |
| 9,460,408 B2 | 10/2016 | Berlandier et al. |
| 10,127,147 B2 | 11/2018 | Oberle |
| 10,140,102 B2 | 11/2018 | Cragun et al. |
| 10,169,188 B2 | 1/2019 | Belekar et al. |
| 10,318,402 B2 | 6/2019 | Oberle |
| 10,726,095 B1 * | 7/2020 | Pallemulle .......... G06F 16/9577 |
| 10,783,210 B1 * | 9/2020 | Dhillon ................ G06F 16/958 |
| 10,984,360 B2 | 4/2021 | Stevens et al. |
| 11,321,093 B1 | 5/2022 | Gunda et al. |
| 11,379,227 B2 | 7/2022 | Rao et al. |
| 11,544,452 B2 | 1/2023 | Agarwal et al. |
| 11,611,627 B2 | 3/2023 | Totale et al. |
| 11,614,924 B1 | 3/2023 | Agrawal et al. |

(Continued)

OTHER PUBLICATIONS

Akanksha Singh, "Text to Image Using Deep Learning", International Journal of Engineering Research & Technology, Apr. 2021, p. 194-198, vol. 10 Issue 04, http://www.ijert.org.

(Continued)

*Primary Examiner* — Di Xiao

(57) ABSTRACT

A system includes a memory and a processor configured to record a plurality of attributes associated with one or more hardware devices, one or more software applications, or a combination thereof used by the user to perform a plurality of interactions, wherein the plurality of attributes are indicative of one or more characteristics associated with the user. Based on the recorded attributes, the processor determines a user profile associated with the user. Subsequently, in response to detecting that the user has requested to perform an interaction in a UI environment, the processor obtains a UI model associated with the UI environment, obtains a set of conformance rules associated with the determined user profile of the user, and generates a UI screen for the UI environment based on the UI model and the set of conformance rules.

8 Claims, 2 Drawing Sheets

(56) References Cited

U.S. PATENT DOCUMENTS

| | | | |
|---|---|---|---|
| 2018/0129637 A1 | 5/2018 | Lantwin et al. | |
| 2020/0159376 A1 | 5/2020 | Goyal | |
| 2020/0349482 A1* | 11/2020 | Grossman | G06F 9/4881 |
| 2021/0081196 A1 | 3/2021 | Polleri et al. | |
| 2022/0222047 A1 | 7/2022 | Todirel et al. | |
| 2022/0366003 A1* | 11/2022 | Ekron | G06F 3/0482 |
| 2023/0011807 A1 | 1/2023 | Gunda et al. | |

OTHER PUBLICATIONS

Scott Reed, "Generative Adversarial Text to Image Synthesis", Jun. 5, 2016, vol. 48, https://github.com/soumith/dcgan.torch, New York, NY, USA.

Raul Minon, "An Approach to the Integration of Accessibility Requirements into a User Interface Development Method", Journal Homage: www.elsevier.com/locate/scico, Apr. 29, 2013, p. 58-73, http://dx.doi.org/10.1016/j.scico.2013.04.005, Spain.

* cited by examiner

SYSTEM AND METHOD FOR GENERATING A CONTEXT-BASED USER INTERFACE

TECHNICAL FIELD

The present disclosure relates generally to data processing, and more specifically to a system and method for generating a context-based user interface.

BACKGROUND

When a user interface associated with a software application is designed, the user interface needs to satisfy several compliance standards including regulatory standards, accessibility standards (e.g., Americans with Disabilities Act, ADA standards), data privacy/security standards etc. Often different sets of standards apply to different types of users. Thus, a user interface presented to a particular user may need to conform to the set of standards defined for a type of the particular user. For example, accessibility standards may define different sets of UI design rules, wherein each set of UI design rules applies based on a type of disability associated with a particular user who is using the software application. Non-conformance to compliance standards may have several disadvantages including fines, data security breaches and loss of user confidence.

SUMMARY

The system and method implemented by the system as disclosed in the present disclosure provide technical solutions to the technical problems discussed above by providing intelligent techniques for conformance of user interfaces (UIs) to defined standards.

For example, the disclosed system and methods provide the practical application of intelligently generating UI screens associated with software applications based on characteristics of a user using the software application and a set of conformance rules defined for a type of the user. As described in embodiments of the present disclosure, based on monitoring a plurality of interactions performed by a user, a UI manager records a plurality of attributes associated with one or more hardware devices, one or more software applications, or a combination thereof used by the user to perform the plurality of interactions, wherein the plurality of attributes are indicative of one or more characteristics associated with the user. Based on the recorded attributes, UI manager determines a user profile associated with the user. Subsequently, in response to detecting that the user has requested to perform an interaction in a UI environment, the UI manager obtains a UI model associated with the UI environment, obtains a set of conformance rules associated with the determined user profile of the user, and generates a UI screen for the UI environment based on the UI model and the set of conformance rules. Generating the UI screen includes selecting one or more UI elements of the UI model based on the set of conformance rules, wherein each UI element conforms to one or more conformance rules. The UI renders the generated UI screen in the UI environment on a user device of the user.

By intelligently generating UI screens that conform to defined conformance rules, the disclosed system and method save computing resources (e.g., processing and memory resources) which would otherwise be used to analyze several sets of conformance rules and individual generate and render UI screens that conform to the defined rules. Accordingly, the disclosed system and methods improve processing efficiency of computing nodes used to generate and render UT screens in a computing infrastructure. Also, the disclosed system and methods generally improve the technology associated with generating and rendering user interfaces on computers.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
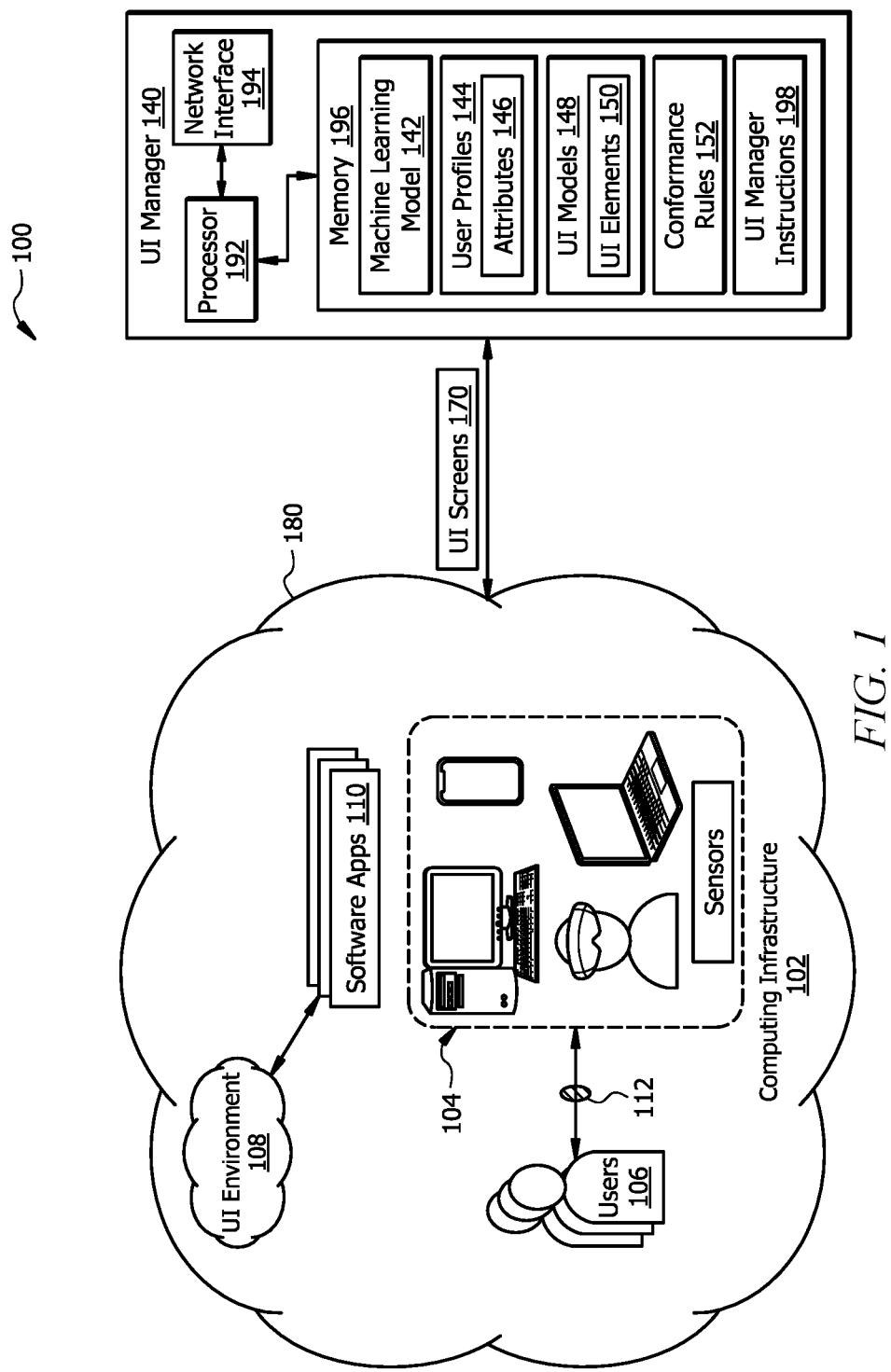
FIG. 1 is a schematic diagram of a system, in accordance with an embodiment of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, input devices, output devices, and memory devices all connected to the network 180. Software components may include software applications 110 that are run by one or more of the computing nodes 104 including, but not limited to, operating systems, user interface applications, web applications, third party software, database management software, service management software, metaverse software and other customized software programs implementing particular functionalities. For example, software code relating to one or more software applications 110 may be stored in a memory device and one or more processors may process the software code to implement respective functionalities. In one embodiment, a software application 110 may be configured to operate in a particular user interface (e.g., UI) environment 108 such as a web environment or a virtual environment (e.g., metaverse environment). For example, when a software application 110 is a web application, the UI associated with the web application is a web UI configured to run in a web environment. On the other hand, when a software application 110 is a metaverse application, the UI associated with the metaverse application is a metaverse UI configured to run in a metaverse environment.

One or more of the computing nodes 104 may be operated by a user 106. For example, a computing node 104 may provide a user interface (e.g., web UI and/or metaverse UI) using which a user 106 may operate the computing node 104 to perform data interactions within the computing infrastructure 102. For example, a user 106 may use a laptop computer to access a web application running on a server, wherein both the laptop computer and the server are part of the computing infrastructure 102. Similarly a user 106 may use VR glasses to access a metaverse application running on a server, wherein both the VR glasses and the server are computing nodes 104 of the computing infrastructure 102.

In one embodiment, at least a first portion of the computing infrastructure 102 may be representative of an Information Technology (IT) infrastructure of an organization/entity. For example, a first portion of the computing nodes 104 and a first portion of the software applications 110 may be part of the IT infrastructure of the organization. In this context, a second portion of the computing infrastructure 102, which is different from the first portion of the computing infrastructure 102, may not be a part of the IT infrastructure of the organization. For example, a second portion of the computing nodes 104 may not be part of the IT infrastructure of the organization and may be operated by users 106 to access software applications 110 running on computing nodes 104 that are part of the first portion of the computing nodes 104 belonging to the IT infrastructure of the organization. In one example scenario, the first portion of the computing infrastructure 102 may belong to a provider of a social media application/platform which provides access to the social media application/platform (e.g., web application or metaverse application) running on servers within the IT infrastructure belonging to the social media provider. Users of the social media platform may access the social media application running on the provider's servers using external computing nodes 104 that are not part of the IT infrastructure of the social media provider.

One or more computing nodes 104 of the computing infrastructure 102 may be representative of a computing system that hosts software applications which may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., UI manager 140) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

One or more computing nodes 104 of the computing infrastructure 102 may implement a UI manager 140 which, as further described below, is responsible for generating and rendering UIs associated with software applications 110. The UI manager 140 comprises a processor 192, a memory 196, and a network interface 194. The UI manager 140 may be configured as shown in FIG. 1 or in any other suitable configuration.

The processor 192 comprises one or more processors operably coupled to the memory 196. The processor 192 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 192 may be a programmable logic device, a microcontroller, a microprocessor, or any suitable combination of the preceding. The processor 192 is communicatively coupled to and in signal communication with the memory 196. The one or more processors are configured to process data and may be implemented in hardware or software. For example, the processor 192 may be 8-bit, 16-bit, 32-bit, 64-bit or of any other suitable architecture. The processor 192 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., UI manager instructions 198) to implement the UI manager 140. In this way, processor 192 may be a special-purpose computer designed to implement the functions disclosed herein. In one or more embodiments, the UI manager 140 is implemented using logic units, FPGAs, ASICs, DSPs, or any other suitable hardware. The UI manager 140 is configured to operate as described with reference to FIG. 2. For example, the processor 192 may be configured to perform at least a portion of the method 200 as described in FIG. 2.

The memory 196 comprises one or more non-transitory computer-readable mediums such as disks, tape drives, or solid-state drives, and may be used as an over-flow data storage device, to store programs when such programs are selected for execution, and to store instructions and data that are read during program execution. The memory 196 may be volatile or non-volatile and may comprise a read-only memory (ROM), random-access memory (RAM), ternary content-addressable memory (TCAM), dynamic random-access memory (DRAM), and static random-access memory (SRAM).

The memory 196 is operable to store a machine learning (ML) model 142, user profiles 144, attributes 146, UI models 148, UI elements 150, conformance rules 152, and the UI manager instructions 198. The UI manager instructions 198 may include any suitable set of instructions, logic, rules, or code operable to execute the UI manager 140.

The network interface 194 is configured to enable wired and/or wireless communications. The network interface 194 is configured to communicate data between the UI manager 140 and other devices, systems, or domains (e.g., computing nodes 104 etc.). For example, the network interface 194 may comprise a Wi-Fi interface, a LAN interface, a WAN interface, a modem, a switch, or a router. The processor 192 is configured to send and receive data using the network interface 194. The network interface 194 may be configured to use any suitable type of communication protocol as would be appreciated by one of ordinary skill in the art.

It may be noted that each of the computing nodes 104 may be implemented like the UI manager 140 shown in FIG. 1. For example, each of the computing nodes 104 may have a respective processor and a memory that stores data and instructions to perform operations discussed above.

When a user interface associated with a software application 110 (e.g., web application, metaverse application etc.) is designed, the user interface needs to satisfy several compliance standards including regulatory standards, accessibility standards (e.g., Americans with Disabilities Act, ADA standards), data privacy/security standards etc. These standards may be defined by an entity managing the software application 110 or by a government institution. Often different sets of standards apply to different types of users 106. Thus, a user interface presented to a particular user 106 may need to conform to the set of standards defined for a type of the particular user. For example, accessibility standards may define different sets of UI design rules, wherein each set of UI design rules applies based on a type of disability associated with a particular user who is using the software application. For example, a UI presented to a color-blind user may need to adhere to a particular color scheme. On the other hand, a UI presented to another user with limited use of hands may need to provide voice to text features. In another example, different sets of data security/privacy rules may apply to corporate users and individual users of the same software application 110. For example, computing nodes 104 used by individual users generally do not implement high data security protocols and thus are vulnerable to cyber-attacks. Accordingly, a UI presented to an individual user needs to include security features such as multi-factor authentication, face recognition, etc. On the other hand, computing systems used by corporate users typically implement high data security protocols. Thus, a UI presented to a corporate user may implement a more relaxed set of data security rules as compared to the rules applied for individual users. Non-conformance of a software application 110 to compliance standards may have several disadvantages including fines, data security breaches and loss of user confidence.

Embodiments of the present disclosure describe techniques for generating UI screens 170 associated with a software application 110 based on characteristics of the user 106 who is using the software application 110.

In this context, UI manager 140 may be configured to determine a user profile 144 associated with a user 106 based on interactions 112 performed by the user 106 in the computing infrastructure 102. Each user profile 144 may be associated with a particular type of users 106. For example, a user profile 144 may be associated with users having a particular type of disability. In this example, user profiles 144 may include, but are not limited to, vision impaired profile, cognitive disability profile, seizure profile, attention deficit hyperactivity disorder (ADHD) profile, blind profile, and impaired motor skills profile. Other example user profiles 144 may include corporate user profile and individual user profile. UI manager 140 may be configured to determine a user profile 144 associated with a particular user 106 based by monitoring a plurality of interactions 112 performed by the user 106 in the computing infrastructure 102. An interaction performed by a user 106 may include the user 106 accessing a software application 110 (e.g., a web application, metaverse application etc.) to perform a particular task such as posting on a social media platform, sending an email message, transfer data files to other users or entities, purchase event tickets and the like. For example, the user 106 may log into a social media platform running on a server as a web application or a virtual application to consume content or to submit content.

Monitoring interactions 112 performed by the particular user 106 may include recording a plurality of attributes 146 associated with one or more hardware devices, one or more software applications, or a combination thereof used by the user 106 while performing the monitored interactions 112. The attributes 146 associated with interactions 112 monitored for the user 106 may indicate one or more characteristics associated with the user 106. In one embodiment, attributes 146 may include a type of one or more hardware devices (e.g., input devices, output devices etc.), a type of one or more software applications, or a combination thereof used by the user 106 while performing the monitored interactions 112. In this context, the type of hardware devices and/or software applications used by a particular user 106 may indicative of a particular type of disability associated with the user 106, and thus may indicate a particular user profile 144 associated with the particular disability. For example, a user 106 having a particular type of disability may use specific hardware devices and/or specific software tools that are designed to help the users 106 having the particular type of disability to perform interactions 112 in the computing infrastructure 102. For example, a vision impaired user may use a braille keyboard and/or a particular software plugin that converts voice to text and vice versa to enable the user 106 to issue voice commands. Other examples of assistive hardware devices and software tools that may be used by users 106 with different types of disabilities may include, but are not limited to, screen readers, adaptive keyboards, alternative input devices, braille displays, electronic screen magnifiers, augmentative and alternative communication software, dictation software, optical character recognition (OCR) software, screen magnification software and text to speech software. Each of these assistive hardware devices and software tools help users 106 with specific types of disabilities and thus are indicative of the type of disability associated with the user 106 using such devices and software.

In another example, attributes 146 may indicate whether a user 106 is employed by a large organization or entity. For example, if a user 106 uses a high-end computer and/or uses an operating system or software tools typically used by large corporations, this is indicative of the user 106 being part of a large organization or entity. On the other hand, when a user 106 uses a low-end computer and/or uses home versions or student versions of an operating system of other software tools, this is indicative of the user 106 a low-end user.

In one or more embodiments, UI manager 140 may be configured to monitor one or more computing nodes 104 used by a user 106 to perform a plurality of interactions 112 and identify the particular hardware devices and software applications used on the computing nodes 104 to perform the interactions 112. Based on monitoring a plurality of interactions 112 performed by a user 106 and attributes 146 (e.g., types of hardware and software tools) recorded for these interactions 112, UI manager 140 may be configured to determine a user profile 144 associate with the user 106. For example, when the user 106 is determined to have used a braille keyboard and text to speech software on a computing node 104 while performing the interactions 112, UI manager 140 determines that the user 106 is associated with a visually impaired profile.

UI manager 140 may be configured to store (e.g., in memory 196) a set of conformance rules 152 mapped to each user profile 144. Conformance rules 152 associated with a user profile 144 define a UI design that is to be followed for UI screens 170 generated for a user 106 associated with the user profile 144. A UI screen 170 associated with a software application 110 needs to conform to the set of conformance rules 152 defined for a particular user profile 144 associated with the user 106 using the software application 110. Conformance rules 152 associated with a particular user profile 144 may be defined by an organization/entity that manages the software application 110 being used by the user 106, a government institution, any other entity, or a combination thereof. For example, conformance rules 152 may include accessibility rules defined for users 106 with disabilities. In one embodiment, conformance rules 152 may include several sets of conformance rules 152 associated with improving accessibility for disabled users, wherein each set of these conformance rules 152 is defined for a different disability associated with the respective user profile 144. For example, a set of conformance rules 152 associated with a visually impaired user profile 144 define a UI design for UI screens 170 generated for users 106 with visual impairment. In one example, conformance rules 152 include conformance rules 152 according to Americans with Disabilities Act (ADA). In one example, a different set of conformance rules 152 is defined for each user profile 144 including, but not limited to, vision impaired profile, cognitive disability profile, seizure profile, attention deficit hyperactivity disorder (ADHD) profile, blind profile, and impaired motor skills profile.

In an additional or alternative embodiment, conformance rules 152 may include data security conformance rules 152 associated with user profiles 144 indicating a degree of data security associated with a user 106. For example, conformance rules 152 associated with a user profile 144 relating to a corporate user may define a UI design with relatively reduced security features (e.g., multi-factor authentication, security questions etc.). On the other hand, conformance rules 152 associated with a user profile 144 relating to a student user may define a UI design with relatively advanced security features.

UI manager 140 may be configured to generate UI screens 170 for a user 106 in a particular UI environment 108 based on the user profile 144 determined for the user 106 as described above and the conformance rules 152 mapped to the user profile 144. As described above, example UI environments 108 may include a web environment or a virtual environment (e.g., metaverse environment). Once a user profile 144 associated with a particular user 106 has been determined, UI manager 140 monitors for interactions 112 requested by the user 106. For example, the user 106 may initiate a login procedure on a web server to access a social media platform in a web environment. UI manager 140 may be configured to determine the UI environment 108 associated with a request for an interaction 112. For example, when the user 106 uses a web browser to initiate the interaction 112, UI manager 140 determines that the UI environment 108 associated with the requested interaction 112 is a web environment. In another example, when the user 106 uses VR glasses to initiate the interaction 112 on a metaverse application, UI manager 140 determines that the UI environment 108 associated with the requested interaction 112 is a metaverse environment.

In response to detecting that the user 106 has requested to perform an interaction 112 in a particular UI environment 108, UI manager 140 obtains a UI model 148 associated with the UI environment 108. In this context, UI manager 140 may store (e.g., in memory 196) a UI model 148 for each UI environment 108. For example, memory 196 may store a first UI model 148 associated with a web environment and may store a second UI model 148 associated with a virtual environment. Each UI model 148 includes a plurality of UI elements 150 that may be used to build a UI screen 170 for a particular software application 110 in the respective UI environment 108. For example, a UI model 148 associated with a web environment may include a plurality of UI elements 150 providing accessibility features for users 106 with different types of disabilities. In this context, example UI elements 150 may include enlarged text for visually impaired users, color contrasted text for color-blind users, and closed captioning for hearing impaired users. Another UI model 148 may include example UI elements 150 such as multi-factor authentication screens, biometric verification screens and other UI screens implementing advanced data security features for high-risk users. Similarly, another UI model 148 associated with a virtual environment may include a plurality of similar UI elements 150 providing accessibility features for users 106 with different types of disabilities.

To generate a UI screen 170 for the user 106, UI manager 140 may be configured to select UI elements 150 from the obtained UI model 148 that conform to at least one conformance rule 152 defined for the user profile 144 associated with the user 106. For example, a set of UI elements 150 included in the UI model 148 may be in conformance with a corresponding set of conformance rules 152 defined for a particular user profile 144 associated with a particular disability. Upon determining that the user 106 who requested to perform the interaction 112 is associated with the particular user profile associated with the particular disability, UI manager 140 may select the set of UI elements 150 from the UI model 148 to generate a UI screen 170 for the user 106. In another example, a second set of UI elements 150 from the UI model 148 may be in conformance with a corresponding set of conformance rules 152 defined for a particular user profile 144 associated with users 106 vulnerable to cyber-attacks. Upon determining that the user 106 who requested to perform the interaction 112 is associated with the particular user profile associated a higher vulnerability of cyber-attacks, UI manager 140 may select the second set of UI elements 150 from the UI model 148 to generate a UI screen 170 for the user 106.

In one or more embodiments, UI manager 140 may be configured to use a machine learning model to perform one or more operations described in this disclosure including determining a user profile 144 of a user 106 and generating a UI screen 170 based on conformance rules 152 defined for the determined user profile 144. For example, to determine a user profile 144 of a user 106, machine learning model 142 may be trained based on attributes 146 associated with one or more hardware devices, one or more software applications, or a combination thereof that are known to be associated with particular user profiles 144.

It may be noted that while embodiments of the present disclosure are described in the context of user profiles 144 associated with disabilities, a person having ordinary skill in the art may appreciate that the discussed techniques generally apply to determining any type of user profile 144 and generating UI screens 170 based on conformance rules 152 defined for the user profile 144.

Figure 2:
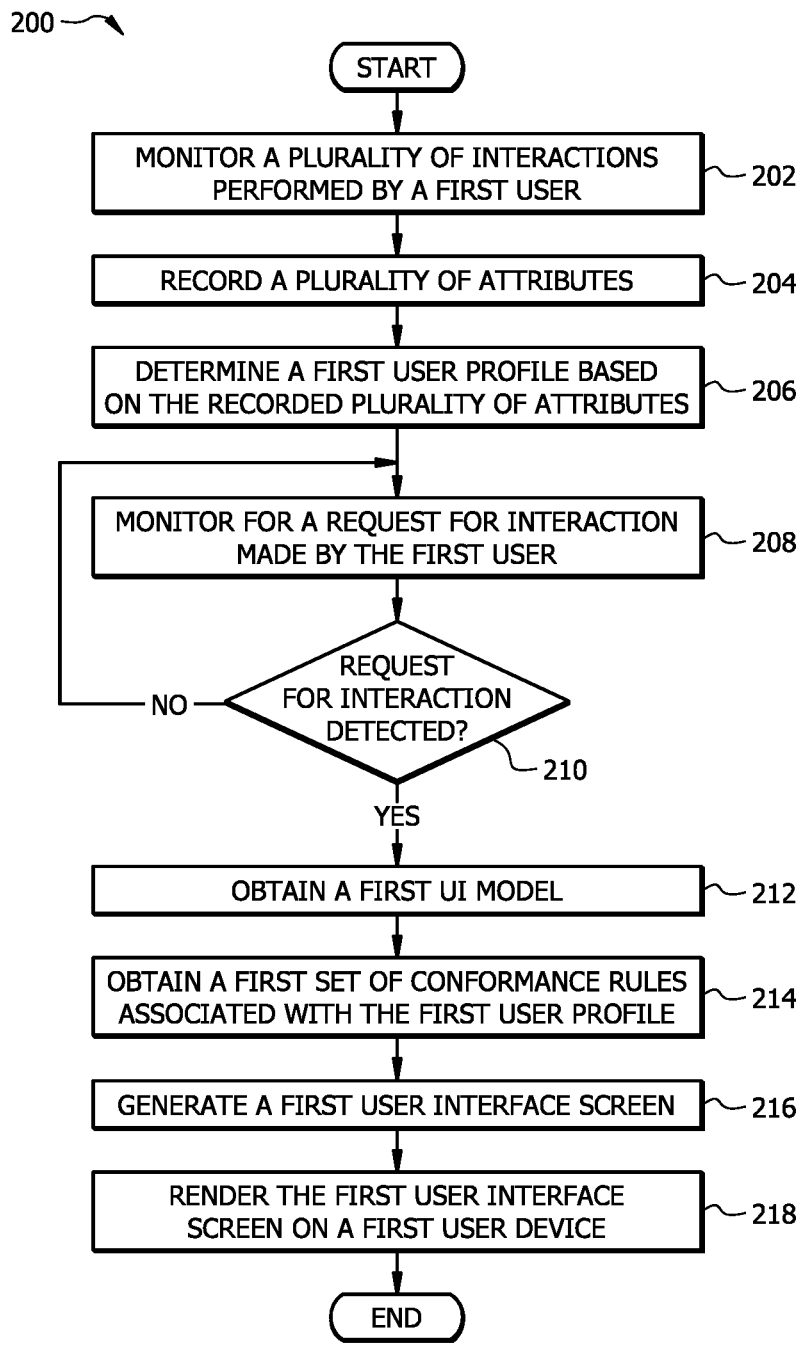
FIG. 2 illustrates a flowchart of an example method for generating a UI screen for a user, in accordance an embodiment of the present disclosure.

FIG. 2 illustrates a flowchart of an example method 200 for generating a UI screen for a user 106, in accordance an embodiment of the present disclosure. Method 200 may be performed by the UI manager 140 shown in FIG. 1.

At operation 202, UI manager 140 monitors a plurality of interactions 112 performed by a first user 106 in a computing infrastructure 102.

As described above, UI manager 140 may be configured to determine a user profile 144 associated with a user 106 based on interactions 112 performed by the user 106 in the computing infrastructure 102. Each user profile 144 may be associated with a particular type of users 106. For example, a user profile 144 may be associated with users having a particular type of disability. In this example, user profiles 144 may include, but are not limited to, vision impaired profile, cognitive disability profile, seizure profile, attention deficit hyperactivity disorder (ADHD) profile, blind profile, and impaired motor skills profile. Other example user profiles 144 may include corporate user profile and individual user profile. UI manager 140 may be configured to determine a user profile 144 associated with a particular user 106 based on monitoring a plurality of interactions 112 performed by the user 106 in the computing infrastructure 102. An interaction performed by a user 106 may include the user 106 accessing a software application 110 (e.g., a web application, metaverse application etc.) to perform a particular task such as posting on a social media platform, sending an email message, transfer data files to other users or entities, purchase event tickets and the like. For example, the user 106 may log into a social media platform running on a server as a web application or a virtual application to consume content or to submit content.

At operation 204, UI manager 140 records a plurality of attributes 146 associated with one or more hardware devices (e.g., computing nodes 104), one or more software applications 110, or a combination thereof used by the first user to perform the plurality of interactions 112, wherein the plurality of attributes 146 are indicative of one or more characteristics associated with the first user 106.

At operation 206, based on the recorded attributes 146, UI manager 140 determines a first user profile 144 applicable to the first user 106.

As described above, monitoring interactions 112 performed by the particular user 106 may include recording a plurality of attributes 146 associated with one or more hardware devices, one or more software applications, or a combination thereof used by the user 106 while performing the monitored interactions 112. The attributes 146 associated with interactions 112 monitored for the user 106 may indicate one or more characteristics associated with the user 106. In one embodiment, attributes 146 may include a type of one or more hardware devices (e.g., input devices, output devices etc.), a type of one or more software applications, or a combination thereof used by the user 106 while performing the monitored interactions 112. In this context, the type of hardware devices and/or software applications used by a particular user 106 may indicative of a particular type of disability associated with the user 106, and thus may indicate a particular user profile 144 associated with the particular disability. For example, a user 106 having a particular type of disability may use specific hardware devices and/or specific software tools that are designed to help the users 106 having the particular type of disability to perform interactions 112 in the computing infrastructure 102. For example, a vision impaired user may use a braille keyboard and/or a particular software plugin that converts voice to text and vice versa to enable the user 106 to issue voice commands. Other examples of assistive hardware devices and software tools that may be used by users 106 with different types of disabilities may include, but are not limited to, screen readers, adaptive keyboards, alternative input devices, braille displays, electronic screen magnifiers, augmentative and alternative communication software, dictation software, optical character recognition (OCR) software, screen magnification software and text to speech software. Each of these assistive hardware devices and software tools help users 106 with specific types of disabilities and thus are indicative of the type of disability associated with the user 106 using such devices and software.

In another example, attributes 146 may indicate whether a user 106 is employed by a large organization or entity. For example, if a user 106 uses a high-end computer and/or uses an operating system or software tools typically used by large corporations, this is indicative of the user 106 being part of a large organization or entity. On the other hand, when a user 106 uses a low-end computer and/or uses home versions or student versions of an operating system of other software tools, this is indicative of the user 106 a low-end user.

In one or more embodiments, UI manager 140 may be configured to monitor one or more computing nodes 104 used by a user 106 to perform a plurality of interactions 112 and identify the particular hardware devices and software applications used on the computing nodes 104 to perform the interactions 112. Based on monitoring a plurality of interactions 112 performed by a user 106 and attributes 146 (e.g., types of hardware and software tools) recorded for these interactions 112, UI manager 140 may be configured to determine a user profile 144 associate with the user 106. For example, when the user 106 is determined to have used a braille keyboard and text to speech software on a computing node 104 while performing the interactions 112, UI manager 140 determines that the user 106 is associated with a visually impaired profile.

At operation 208, UI manager 140 monitors for a request for an interaction 112 made by the first user 106. At operation 210, in response to detecting that the first user 106 has requested to perform a first interaction 112 in a first UI environment 108, method 200 proceeds to operation 212, where UI manager 140 obtains a first UI model 148 associated with the first UI environment 108.

As described above, once a user profile 144 associated with a particular user 106 has been determined, UI manager 140 monitors for interactions 112 requested by the user 106. For example, the user 106 may initiate a login procedure on a web server to access a social media platform in a web environment. UI manager 140 may be configured to determine the UI environment 108 associated with a request for an interaction 112. For example, when the user 106 uses a web browser to initiate the interaction 112, UI manager 140 determines that the UI environment 108 associated with the requested interaction 112 is a web environment. In another example, when the user 106 uses VR glasses to initiate the interaction 112 on a metaverse application, UI manager 140 determines that the UI environment 108 associated with the requested interaction 112 is a metaverse environment.

In response to detecting that the user 106 has requested to perform an interaction 112 in a particular UI environment 108, UI manager 140 obtains a UI model 148 associated with the UI environment 108. In this context, UI manager 140 may store (e.g., in memory 196) a UI model 148 for each UI environment 108. For example, memory 196 may store a first UI model 148 associated with a web environment and may store a second UI model 148 associated with a virtual environment. Each UI model 148 includes a plurality of UI elements 150 that may be used to build a UI screen 170 for a particular software application 110 in the respective UI environment 108. For example, a UI model 148 associated with a web environment may include a plurality of UI elements 150 providing accessibility features for users 106 with different types of disabilities. In this context, example UI elements 150 may include enlarged text for visually impaired users, color contrasted text for color-blind users, and closed captioning for hearing impaired users. Another UI model 148 may include example UI elements 150 such as multi-factor authentication screens, biometric verification screens and other UI screens implementing advanced data security features for high-risk users. Similarly, another UI model 148 associated with a virtual environment may include a plurality of similar UI elements 150 providing accessibility features for users 106 with different types of disabilities.

At operation 214, UI manager 140 obtains a first set of conformance rules 152 associated with the first user profile 144.

As described above, UI manager 140 may be configured to store (e.g., in memory 196) a set of conformance rules 152 mapped to each user profile 144. Conformance rules 152 associated with a user profile 144 define a UI design that is to be followed for UI screens 170 generated for a user 106 associated with the user profile 144. A UI screen 170 associated with a software application 110 needs to conform to the set of conformance rules 152 defined for a particular user profile 144 associated with the user 106 using the software application 110. Conformance rules 152 associated with a particular user profile 144 may be defined by an organization/entity that manages the software application 110 being used by the user 106, a government institution, any other entity, or a combination thereof. For example, conformance rules 152 may include accessibility rules defined for users 106 with disabilities. In one embodiment, conformance rules 152 may include several sets of conformance rules 152 associated with improving accessibility for disabled users, wherein each set of these conformance rules 152 is defined for a different disability associated with the respective user profile 144. For example, a set of conformance rules 152 associated with a visually impaired user profile 144 define a UI design for UI screens 170 generated for users 106 with visual impairment. In one example, conformance rules 152 include conformance rules 152 according to Americans with Disabilities Act (ADA). In one example, a different set of conformance rules 152 is defined for each user profile 144 including, but not limited to, vision impaired profile, cognitive disability profile, seizure profile, attention deficit hyperactivity disorder (ADHD) profile, blind profile, and impaired motor skills profile.

In an additional or alternative embodiment, conformance rules 152 may include data security conformance rules 152 associated with user profiles 144 indicating a degree of data security associated with a user 106. For example, conformance rules 152 associated with a user profile 144 relating to a corporate user may define a UI design with relatively reduced security features (e.g., multi-factor authentication, security questions etc.). On the other hand, conformance rules 152 associated with a user profile 144 relating to a student user may define a UI design with relatively advanced security features.

At operation 216, UI manager 140 generates a first user interface screen 170 for the first UI environment 108 based on the first UI model 148 and the first set of conformance rules 152, wherein generating the first UI screen 170 comprises selecting one or more UI elements 150 of the UI model 148 based on the first set of conformance rules 152, wherein each UI element 150 conforms to one or more conformance rules 152.

As described above, to generate a UI screen 170 for the user 106, UI manager 140 may be configured to select UI elements 150 from the obtained UI model 148 that conform to at least one conformance rule 152 defined for the user profile 144 associated with the user 106. For example, a set of UI elements 150 included in the UI model 148 may be in conformance with a corresponding set of conformance rules 152 defined for a particular user profile 144 associated with a particular disability. Upon determining that the user 106 who requested to perform the interaction 112 is associated with the particular user profile associated with the particular disability, UI manager 140 may select the set of UI elements 150 from the UI model 148 to generate a UI screen 170 for the user 106. In another example, a second set of UI elements 150 from the UI model 148 may be in conformance with a corresponding set of conformance rules 152 defined for a particular user profile 144 associated with users 106 vulnerable to cyber-attacks. Upon determining that the user 106 who requested to perform the interaction 112 is associated with the particular user profile associated a higher vulnerability of cyber-attacks, UI manager 140 may select the second set of UI elements 150 from the UI model 148 to generate a UI screen 170 for the user 106.

At operation 218, UI manager 140 renders the first UI screen 170 in the first UI environment 108 on a first user device (e.g., computing node 104) of the first user 106.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
　a memory storing a plurality of user profiles and a set of conformance rules associated with each user profile; and
　a processor communicatively coupled to the memory and configured to:
　　monitor a plurality of interactions performed by a first user in a computing infrastructure;
　　record, based on the monitoring, a plurality of attributes associated with one or more hardware devices, one or more software applications, or a combination thereof used by the first user to perform the plurality of interactions, wherein the plurality of attributes are indicative of one or more characteristics associated with the first user;
　　determine, based on the recorded plurality of attributes, a first user profile of the plurality of user profiles applicable to the first user;
　　detect that the first user has requested to perform a first interaction in a first user interface environment;
　　obtain a first user interface model associated with the first user interface environment;
　　obtain a first set of conformance rules associated with the first user profile;

generate a first user interface screen for the first user interface environment based on the first user interface model and the first set of conformance rules, wherein generating the first user interface screen comprises selecting one or more user interface elements of the first user interface model based on the first set of conformance rules, wherein each user interface element conforms to one or more conformance rules; and render the first user interface screen in the first user interface environment on a first user device of the first user;

wherein the plurality of user profiles comprise a set of user profiles associated with user disabilities, wherein each user profile from the set is associated with a different type of user disability;

wherein the processor is further configured to:

determine the plurality of attributes by determining that the first user used a hardware input device, a hardware output device, a software application, or a combination thereof designed for use by persons of a particular type of disability; and select the first user profile associated with the particular type of disability from the plurality of user profiles;

wherein the first set of conformance rules comprises user interface standards defined for persons associated with the particular type of disability; and wherein the processor generates the first user interface screen by selecting from the first user interface model one or more user interface elements that conform to the user interface standards defined for persons associated with the particular type of disability.

2. The system of claim 1, wherein the plurality of attributes comprises a type of one or more hardware input devices, a type of one or more hardware output devices, a type of one or more software applications, or a combination thereof.

3. The system of claim 1, wherein the first user interface environment comprises a web environment or a virtual environment.

4. A method for generating UI screens, comprising:

monitoring a plurality of interactions performed by a first user in a computing infrastructure;

recording, based on the monitoring, a plurality of attributes associated with one or more hardware devices, one or more software applications, or a combination thereof used by the first user to perform the plurality of interactions, wherein the plurality of attributes are indicative of one or more characteristics associated with the first user;

determining, based on the recorded plurality of attributes, a first user profile of a plurality of user profiles applicable to the first user;

detecting that the first user has requested to perform a first interaction in a first user interface environment;

obtaining a first user interface model associated with the first user interface environment;

obtaining a first set of conformance rules associated with the first user profile, wherein a set of conformance rules is associated with each user profile;

generating a first user interface screen for the first user interface environment based on the first user interface model and the first set of conformance rules, wherein generating the first user interface screen comprises selecting one or more user interface elements of the first user interface model based on the first set of conformance rules, wherein each user interface element conforms to one or more conformance rules; and rendering the first user interface screen in the first user interface environment on a first user device of the first user;

wherein the plurality of user profiles comprise a set of user profiles associated with user disabilities, wherein each user profile from the set is associated with a different type of user disability;

the method further comprising:

determining the plurality of attributes by determining that the first user used a hardware input device, a hardware output device, a software application, or a combination thereof designed for use by persons of a particular type of disability; and selecting the first user profile associated with the particular type of disability from the plurality of user profiles;

wherein the first set of conformance rules comprises user interface standards defined for persons associated with the particular type of disability; and wherein generating the first user interface screen comprises selecting from the first user interface model one or more user interface elements that conform to the user interface standards defined for persons associated with the particular type of disability.

5. The method of claim 4, wherein the plurality of attributes comprises a type of one or more hardware input devices, a type of one or more hardware output devices, a type of one or more software applications, or a combination thereof.

6. The method of claim 4, wherein the first user interface environment comprises a web environment or a virtual environment.

7. A non-transitory computer-readable medium storing instructions that when executed by a processor cause the processor to:

monitor a plurality of interactions performed by a first user in a computing infrastructure;

record, based on the monitoring, a plurality of attributes associated with one or more hardware devices, one or more software applications, or a combination thereof used by the first user to perform the plurality of interactions, wherein the plurality of attributes are indicative of one or more characteristics associated with the first user;

determine, based on the recorded plurality of attributes, a first user profile of a plurality of user profiles applicable to the first user;

detect that the first user has requested to perform a first interaction in a first user interface environment;

obtain a first user interface model associated with the first user interface environment;

obtain a first set of conformance rules associated with the first user profile, wherein a set of conformance rules is associated with each user profile;

generate a first user interface screen for the first user interface environment based on the first user interface model and the first set of conformance rules, wherein generating the first user interface screen comprises selecting one or more user interface elements of the first user interface model based on the first set of conformance rules, wherein each user interface element conforms to one or more conformance rules; and render the first user interface screen in the first user interface environment on a first user device of the first user;

wherein the plurality of user profiles comprise a set of user profiles associated with user disabilities, wherein each user profile from the set is associated with a different type of user disability;

wherein the instructions further cause the processor to:
  determine the plurality of attributes by determining that the first user used a hardware input device, a hardware output device, a software application, or a combination thereof designed for use by persons of a particular type of disability; and
  select the first user profile associated with the particular type of disability from the plurality of user profiles;

wherein the first set of conformance rules comprises user interface standards defined for persons associated with the particular type of disability;

wherein generating the first user interface screen comprises selecting from the first user interface model one or more user interface elements that conform to the user interface standards defined for persons associated with the particular type of disability.

8. The non-transitory computer-readable medium of claim 7, wherein the plurality of attributes comprises a type of one or more hardware input devices, a type of one or more hardware output devices, a type of one or more software applications, or a combination thereof.

* * * * *